United States Patent Office 3,801,663
Patented Apr. 2, 1974

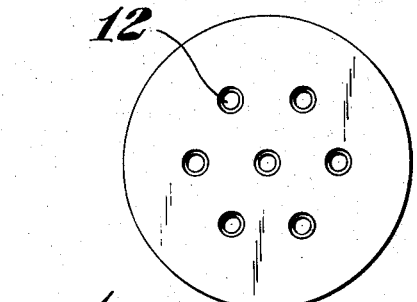
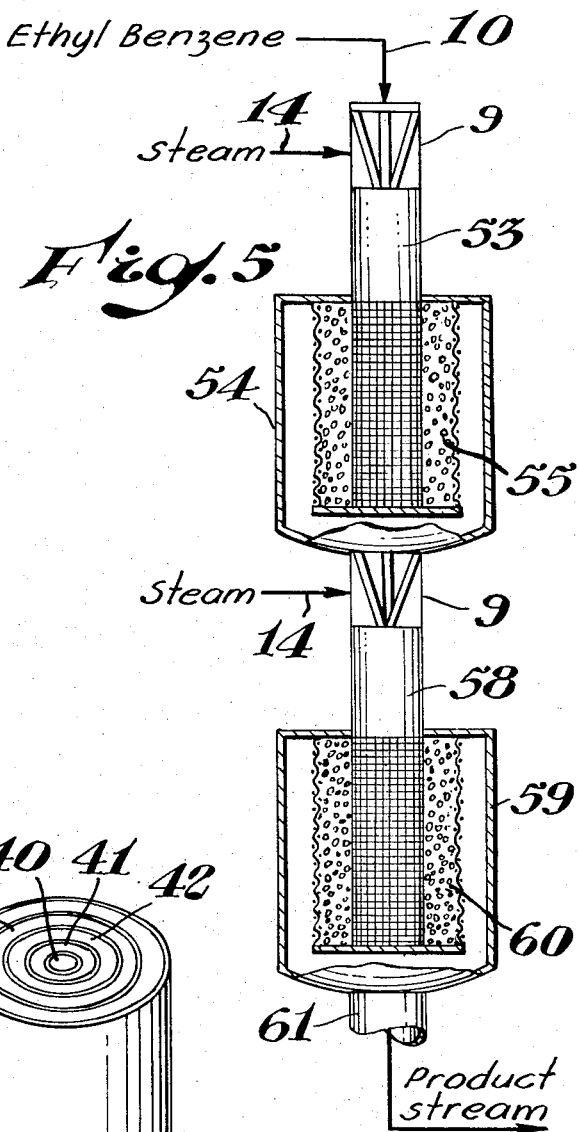
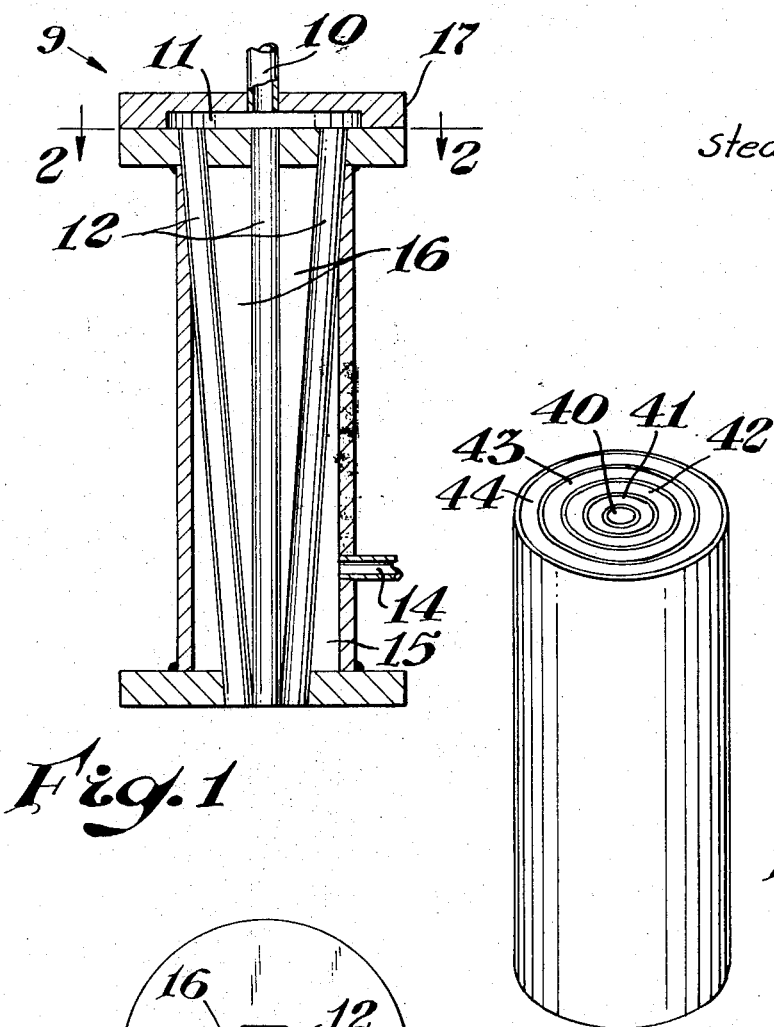
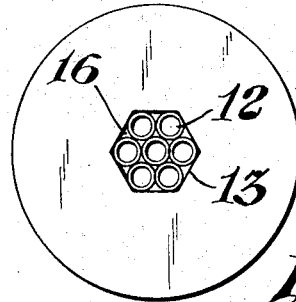

3,801,663
DEHYDROGENATION OF ALKYLATED AROMATIC HYDROCARBONS
George P. Knox, P.O. Box 2673, Freeport, Tex. 77541; and Gene C. Cutler, 533 Oak Drive, Lake Jackson, Tex. 77566
Filed July 13, 1971, Ser. No. 162,239
Int. Cl. C07c *15/10*
U.S. Cl. 260—669 R          7 Claims

ABSTRACT OF THE DISCLOSURE

An improved process for the dehydrogenation of alkyl-substituted aromatic compounds to produce alkenyl substituted aromatics, e.g. styrene, whereby high temperature steam is mixed with the compound to be dehydrogenated by employing a multiple stream exit mixing device. By employing such a mixing device it is possible to use steam having a temperature of from 825° C. to about 1000° C. while at the same time increasing the conversion without sacrificing the yield to the desired product.

---

This invention relates to an improved method for the dehydrogenation of alkylated aromatic hydrocarbons whereby the conversion of reactant to final product is greatly increased without any significant loss in yield.

The process of manufacturing vinyl aromatic hydrocarbons, such as styrene, by rapidly passing alkylated aromatic hydrocarbons and steam at high temperatures over a suitable catalyst bed is common knowledge in the art and has been widely practiced commercially. For example, in the production of styrene, the usual method is to mix superheated steam and vaporized ethylbenzene in the correct proportion to produce the desired reaction temperature and then to pass the mixture through a catalytic reactor whereby dehydrogenation of ethylbenzene to styrene occurs.

The dehydrogenation of an alkylated aromatic hydrocarbon is known to be a strongly endothermic reaction. Therefore, the amount of the hydrocarbon dehydrogenated is dependent on the amount of heat supplied to the reactor per unit of alkylated aromatic hydrocarbon. In the older methods of styrene production, two types of reactors were in common use. They were (1) a massive fixed bed of catalyst where the heat of reaction is supplied solely by superheated steam added with the hydrocarbon feed and (2) a shell and tube reactor where heat is supplied through the tube walls from flue gas in contact with the outside of the tubes to maintain a more constant reaction temperature. In the massive fixed bed, the heat input and therefore the conversion of alkylated hydrocarbon can be increased by increasing the amount of or temperature of the superheated steam added with the feed to the reactor. However, this must be balanced against by-products formation and the cost of steam itself; and, generally speaking, the hotter the steam to the reactor the lower the yield. The same considerations generally apply to the shell and tube reactor.

Other methods have been tried to increase the dehydrogenation conversion while maintaining yield. Over the years, catalysts have been improved by changing constituents and particle size and reactors have been redesigned to take better advantage of the heat. These systems, however, seem limited to conversions of 38–40% on a plant scale if a reasonable yield is to be obtained.

In more recent processes, multiple reactors are employed and the heat required to maintain the reaction is supplied between the reaction stages. One method for supplying such heat is shown in U.S. 3,118,006 (Lovett et al.) wherein steam is added directly to the effluent of one reactor to increase the temperature of the reaction mixture before entering the next reactor. By this method of employing multiple reactors and direct injection of steam between the reaction stages, conversions as high as 50% are obtainable while the yield to styrene is maintained at a desirable level e.g. 90% or above. Even the more recent innovations and process designs, however, have seemed unable to increase the conversion of the alkylated aromatic hydrocarbon to substantially above 50% without adversely affecting the yield to the desired vinyl aromatic hydrocarbon.

It has been accepted for many years in the field of dehydrogenation of alkyl aromatic hydrocarbons, that as the conversion is increased the yield to the desired product will correspondingly decrease. It is evident, therefore, that a process providing higher conversions at the same yield would be extremely attractive from a commercial standpoint and a highly desirable addition to the art of dehydrogenation of alkyl aromatic hydrocarbons.

It has likewise been accepted in the art that where steam is employed to supply heat to hydrocarbon feed by direct contact, such steam cannot be at a temperature in excess of 800° C. without adversely affecting the yield of the desired product. Steam temperatures in excess of 800° C. have been avoided due to the rapid thermal cracking which normally occurs on contact between the hydrocarbon feed and the high temperature steam. However, since the use of higher temperature steam would permit the handling of much smaller volumes of steam in this reaction, the use of such steam would be highly desirable if it could be employed without an undue amount of thermal degradation of the hydrocarbons present in the feed stream.

It is an object of the present invention to provide a new and improved method for increasing the dehydrogenation conversion of alkylated aromatic hydrocarbons to vinyl substituted aromatic hydrocarbons. It is a further object to provide a method for employing high temperature steam to supply heat directly to such dehydrogenation without causing excessive thermal cracking. These and other objects and advantages of the present process will become apparent in the following detailed description of the invention.

FIG. 1 is a longitudinal sectional view of one embodiment of the exit mixing device employed in the invention herein described.

FIG. 2 is a cross-sectional view of the upper end of the embodiment of FIG. 1 taken on section line 2—2.

FIG. 3 is a plan view of the bottom end of the embodiment of FIG. 1.

FIG. 4 is an isometric view of another embodiment of the exit mixing device employed in the present invention.

FIG. 5 is a schematic flow diagram illustrating one embodiment of the invention herein described.

In a preferred embodiment of this invention, two or more catalytic dehydrogenation reactors or reactor beds, operating in series, are used whereby the alkylated aromatic hydrocarbon to be dehydrogenated is fed to the first reactor mixed with only a fraction of the total amount of steam. If two reactors are used, the effluent from said first reactor is mixed with the remainder of the usual quantity of steam in a multiple stream exit mixing device, as hereinafter defined, and the mixture is fed to the second reactor where more of the alkylated aromatic hydrocarbon is dehydrogenated and the vinyl-substituted aromatic hydrocarbon product is subsequently recovered by distillation. This scheme can be repeated for any number of reactors in series. When the steam injected between the reaction stages is introduced into and admixed with the effluent of the first reactor zone by passing it through a multiple stream exit mixing device, as hereinafter defined, it has been found that steam having a temperature of from about 825° C. to about 1000° C. may be employed to supply the necessary heat to raise the temperature of the hydrocarbon stream without producing a harmful amount of thermal cracking and a consequent reduction in yield.

FIGS. 1, 2 and 3 illustrate a preferred embodiment of the multiple stream exit mixing device employed in the process of the present invention. In this mixer, which is generally shown at 9, conduit 10, containing one of the components to be mixed, connects to head space 11 in flange 17. From head space 11, the component passes through tubes 12 which converge into opening 13 in the bottom of the mixing device. The other component is introduced through conduit 14 into cavity 15. This component passes through interstitial spaces 16 formed by tubes 12. Therefore, as the gases pass from the exit mixing device, the relatively small multiple streams of hydrocarbon and high temperature steam are in an alternating arrangement with one another which provides juxtaposition and close contact such that rapid mixing occurs after the streams exit from the mixing device.

FIG. 4 provides an isometric view of an alternative design of a multiple stream exit mixing device. A series of concentric tubes form annular spaces 40, 41, 42, 43 and 44. Therefore, to achieve exit mixing of the steam and hydrocarbon components, a hydrocarbon stream is fed to alternate annular spaces e.g. 40, 42 and 44, while high temperature steam is fed to the remaining annular spaces, e.g. 41 and 43. A greater or lesser number of such spaces can be provided as required.

FIG. 5 shows a cross-sectional flow diagram embodying the invention herein described. As an example, in the production of styrene from ethyl benzene, the following conditions, applied to the flow diagram of FIG. 1, are illustrative of, but not limiting to, the invention:

A flow of 100 lbs./hr. of vaporized ethyl benzene at about 580° C. is passed through conduit 10 and mixed with about 60 lbs./hr. of superheated steam from conduit 14 at about 850° C. as the two streams pass from the multiple stream exit mixer 9. The mixture passes through conduit 53 to the first reactor 54 at a reaction temperature of about 650° C. The ethyl benzene is dehydrogenated in the reactor upon contact with a fixed bed of catalyst 55 which has a composition of 86.8% ferric oxide, 1.6% chromium oxide and 11.9% potassium, calculated as potassium carbonate, and is in the form of 3/16" pellets. The effluent withdrawn from the first reactor 54 is at a temperature of approximately 640° C. Then, 50 lbs./hr. of steam at about 1000° C. from conduit 14 is admixed with this effluent as the steam and effluent pass from exit mixer 9, through conduit 58 to the second reactor 59 at about 670° C. The reactants pass through a second bed of dehydrogenation catalyst 60 and are withdrawn from the second reactor at about 650° C. About 45% of the ethylbenzene originally introduced to the first reactor has now been converted to which 91% is styrene. The total stream passes from the second reactor through conduit 61 to a third mixer at about 650° C. where an additional 15 lbs./hr. of steam at about 1000° C. is added; thence the mixture is passed to a third reactor at a temperature of about 660° C. where more of the ethylbenzene is converted to styrene. Thus, following the third stage reaction approximately 65% of the ethylbenzene has been converted to a product of which 91% is styrene. The hydrocarbon-steam stream is then cooled, condensed and separated, followed by distillation of the hydrocarbon portion to separate the styrene which is subsequently purified by further distillation. Even at such relatively high conversions, the yields of styrene from ethyl benzene are at least equal to the yields obtained with conventional techniques of dehydrogenation. Although the drawings show more than one vessel, it is obvious that all of the reactor beds may be in the same vessel.

This method is repeated for any number of reactors in series but the use of such injection of steam between two or three reaction stages are usually the most practical. Thus, by such means, the object of injecting more heat energy into the reaction to drive it toward higher conversion is accomplished without producing excessive thermal cracking. It is possible, therefore, by following the process of this invention, to employ steam having temperatures in excess of 800° C. to produce higher conversions of the alkylated aromatic hydrocarbon without reducing the yield of vinyl substituted aromatic hydrocarbons to an uneconomical level.

The particular advantage of this invention is the significantly increased conversion of alkylated aromatic hydrocarbon to vinyl substituted aromatic hydrocarbon which was unexpected in view of numerous process modifications in the prior art which were not significant enough to justify changes or addition in the usual or normal method of dehydrogenating alkylated aromatic hydrocarbons used predominantly in the industry.

Since, in commercial practice, the feed to the dehydrogenation reactors and the effluent therefrom contain steam and hydrocarbons other than the alkyl substituted aromatic hydrocarbon, these streams are frequently referred to herein as the "hydrocarbon stream" for simplicity and to distinguish them from the steam employed to supply heat to the reaction.

The terms, "multiple stream exit mixing device," "exit mixing device," and "multiple tube mixer," as used herein refer to a device such as shown in FIGS. 1, 2, 3 and 4 which comprises a multiplicity of substantially tubular zones capable of receiving two separate streams in alternating tubular spaces. Such streams do not contact one another within the mixing device but are divided therein into the plurality of alternating streams such that upon passing from the mixing device the relatively smaller and juxtaposed streams of hydrocarbon and steam mix thoroughly and rapidly as they pass to the next reaction zone. This thorough and rapid mixing greatly reduces the thermal cracking normally encountered when high temperature steam is injected directly into a hydrocarbon stream in a quantity sufficient to heat such stream to temperatures suitable for dehydrogenation.

Any of the well-known dehydrogenation catalysts may be employed in the process of this invention but the preferred catalysts contain predominantly $Fe_2O_3$ admixed with $K_2O$ and $Cr_2O_3$ but may contain additional activators, stabilizers or surface area regulators.

It has been determined that the present method can be operated with as little as a total of 1.5 lbs. of steam and as high as 10 lbs. of steam/lb. of alkylated aromatic hydrocarbon. However, for the practical reasons of economy of operation the preferred range is from 2–3 lbs. of total steam per pound of alkylated aromatic hydrocarbon.

Reactor size has no bearing on the operation of the invention but it is presumed that the optimum size to give the proper residence time, as is usual in this type of dehydrogenation reactor, will be used. Reactor configuration is likewise unimportant so long as relatively low pressure drop across the reactor is achieved. This reaction can be practiced in a fixed-bed reactor, tubular reactor or fluidized-bed reactor with equal success. Multiple reactors can be used in this invention, depending upon the economics of the situation, of the range of from 2 to 5 reactors in a series. However, for the most desirable combination of conversion of alkylated aromatic hydrocarbon and acceptable yields, a preferred number of reactors is usually 2 or 3. Even though multiple reaction stages are preferred, the injection of steam in the manner of this invention is likewise advantageous in a single reaction stage employing a massive fixed bed of catalyst where the total alkyl substituted aromatic feed and the total steam is admixed prior to entering the catalyst bed in the reactor.

Where multiple reactors are employed, sufficient steam is added between the reactors to provide the heat necessary to raise the temperature of the mixture to the required reaction temperature. For a two-reactor system, the steam split between the first reactor inlet and the second reactor inlet can usually be adjusted from a ratio of from 1:3 to 3:1 but the preferred ratio is usually from 2:3 to 3:2.

By similar procedure, other alkylated aromatic hydrocarbons such as isopropyl benzene, diethyl benzene, ethyl naphthalene, ethyl chlorobenzene may be dehydrogenated to produce corresponding vinyl substituted aromatic hydrocarbons.

The dehydrogenation reaction is preferably conducted at a temperature of from about 550° C. to about 700° C. but the preferred range for the reaction is usually from about 620 to about 685° C. for most of the present dehydrogenation catalysts.

The advantages of the present invention are achieved by employing steam having a temperature of from about 825° C. to about 1000° C. to reheat the reactor effluent as described herein. In most instances it is preferred to employ steam for this purpose having a temperature of from about 870° C. to about 900° C. Where multiple reaction stages are employed it is not usually required to employ such high temperature steam to heat the feed to first reactor stage but is necessary for the subsequent stages and may be used for the first reaction stage as well. For such first stage, steam having a temperature of from about 650° C. to about 825° C. may also be employed.

EXAMPLE 1

As illustrated in FIG. 5, three adiabatic radial bed reactors were connected in series and the hydrocarbon and steam feeds to each reactor were first passed through an alternating tube exit mixing device as illustrated in FIG. 1. The catalyst employed was a standard dehydrogenation catalyst having a bulk density of 1.33 g./cc. and a surface area of 2.04 m.$^2$/g. and containing 70.0% $Fe_2O_3$, 13.0% $K_2O$, 1.5% $Cr_2O_3$, and 2.6% $V_2O_5$. The total catalyst volume was 0.5534 ft.$^3$ with 0.1273 ft.$^3$ in the first reactor, 0.1605 ft.$^3$ in the second reactor and 0.2655 ft.$^3$ in the third reactor.

Into the tube side of the first mixing device was fed 12.0 lbs. of steam and 30.25 lbs./hr. of a hydrocarbon stream containing 97.01 wt. percent of ethyl benzene, 0.27 weight percent benzene, 2.62 weight percent toluene and 0.13 weight percent styrene. The temperature of this hydrocarbon-steam stream passing to the mixer was 588° C. Into the shell side of the mixer was fed 18.1 lbs./hr. of steam having a temperature of 872° C. The mixed stream passed from the mixer to the catalyst bed at a temperature of 654° C., and passed through the catalyst bed to the outer shell of the reactor to form an effluent stream having a temperature of 645° C. This effluent stream passed through the tube side of the second mixer. To the shell side of the mixer was added 15.1 lbs./hr. of 1000° C. steam. The mixed stream passing to the second catalyst bed had a temperature of about 672° C. and, after passing through the bed, formed an effluent from the second reactor having a temperature at 651° C. Again the effluent passed through the tube side of a mixer wherein 15.1 lbs./hr. of 1000° C. steam were fed to the shell side. After mixing in the conduit below the mixer, the stream had a temperature of 662° C. and entered the third reactor at such temperature. The effluent from the third reactor showed an ethyl benzene conversion of 66.3 weight percent and a yield to styrene of 90.7 weight percent.

For purposes of comparison, the same reactor system and same catalyst was employed under substantially the same reaction conditions except that standard "T" mixers were employed in the place of the alternating tube mixing devices. The steam employed in the 3 mixing devices was at temperatures of 757°, 910° and 916° C., respectively. The results showed an ethyl benzene conversion of 43.6 and a styrene yield of 92.1.

Thus, it is seen that an improvement of over 20 percent in conversion is realized while the yield to styrene remains at more than 90 percent.

EXAMPLES 2–6

Additional comparative examples are shown in the table below. Note that the use of 1000° C. steam to the second and third multiple tube mixers ("MT") did not deleteriously affect the yield, while conversions improved due to the excellent mixing achieved by the alternating tube mixer. The "T" mixing devices used in Examples 3 and 5 are representative of the known art.

TABLE

| Example No. | Reactor No. | Lbs. steam per hr. | Steam temp. (° C.) | Lbs. HC[1] per hr. | S/O[2] ratio | Vapor temp. (° C.) Mixer tube | Vapor temp. (° C.) Mixer outlet | Cumulative percent Conv. | Cumulative percent Yield |
|---|---|---|---|---|---|---|---|---|---|
| 2 | | (+11.4) | | | | | | | |
| "MT" Mixer | 1 | 17.6 | 868 | 30.1 | 0.96 | 609 | 658 | 24.5 | 92.5 |
| | 2 | 15.7 | 1,000 | 30.1 | 1.49 | 647 | 667 | 54.9 | 92.2 |
| | 3 | 15.8 | 1,000 | 30.1 | 2.01 | 644 | 655 | 67.1 | 91.1 |
| | Overall | 60.5 | | 30.1 | | | | 67.9 | 90.3 |
| 3 | | (+12.4) | | | | | | | |
| "T" Mixer | 1 | 18.4 | 737 | 29.9 | 1.03 | 670 | 654 | 10.5 | 91.1 |
| | 2 | 15.5 | 888 | 29.9 | 1.55 | 620 | 657 | 20.7 | 92.0 |
| | 3 | 15.5 | 838 | 29.9 | 2.07 | 602 | 639 | 31.3 | 91.2 |
| | Overall | 61.8 | | 29.9 | | | | 30.2 | 92.4 |
| 4 | | (+12.1) | | | | | | | |
| "MT" Mixer | 1 | 18.5 | 872 | 30.3 | 1.01 | 584 | 654 | 20.4 | 93.2 |
| | 2 | 15.1 | 1,000 | 30.3 | 1.51 | 643 | 672 | 43.4 | 91.1 |
| | 3 | 15.2 | 1,000 | 30.3 | 2.01 | 651 | 660 | 65.6 | 91.0 |
| | Overall | 60.9 | | 30.3 | | | | 64.5 | 90.1 |
| 5 | | (+11.7) | | | | | | | |
| "T" Mixer | 1 | 19.1 | 773 | 29.9 | 1.03 | 687 | 667 | 11.3 | 90.0 |
| | 2 | 15.1 | 921 | 29.9 | 1.54 | 630 | 663 | 27.9 | 91.0 |
| | 3 | 14.9 | 916 | 29.9 | 2.04 | 608 | 665 | 46.5 | 90.8 |
| | Overall | 60.9 | | 29.9 | | | | 47.9 | 91.0 |
| 6 | | (+12.0) | | | | | | | |
| "MT" Mixer | 1 | 18.0 | 870 | 30.3 | 0.99 | 586 | 651 | 19.9 | 92.7 |
| | 2 | 15.2 | 1,000 | 30.3 | 1.49 | 640 | 662 | 40.0 | 92.2 |
| | 3 | 15.3 | 1,000 | 30.3 | 2.00 | 642 | 655 | 62.2 | 91.7 |
| | Overall | 60.5 | | 30.3 | | | | 64.5 | 91.0 |

[1] HC=hydrocarbon feed comprising 95% ethylbenzene.
[2] S/O ratio=lbs. of steam/lb. of ethylbenzene.

We claim:

1. In a process for dehydrogenating an alkylated aromatic hydrocarbon feed in the presence of steam in a plurality of catalytic dehydrogenation beds which are operated in series wherein the effluent from one reactor bed is introduced into the next reactor bed and a portion of the hydrocarbon is dehydrogenated in each reactor at a temperature of from about 550° C. to about 700° C. and a portion of the total steam is introduced into the hydrocarbon feed inlet of each reactor bed, the improvement which comprises, in the inlet of at least one reactor bed, passing both the steam and hydrocarbon streams through an exit mixer wherein plurality of alternating streams of hydrocarbon and steam are formed, passing said alternating streams from said mixer into the inlet of such reactor to provide rapid mixing and heat exchange between said streams.

2. In a process for dehydrogenating an alkylated aromatic hydrocarbon feed in the presence of steam in a plurality of catalytic dehydrogenation beds which are operated in series wherein the effluent from one reactor bed is introduced into the next reactor bed and a portion of the hydrocarbon is dehydrogenated in each reactor at a temperature of from about 550° C. to about 700° C. and a portion of the total steam is introduced into the hydrocarbon feed inlet of each reactor bed, the improvement which comprises admixing the effluent hydrocarbon stream from at least one of said reactors with high temperature steam to provide heat thereto by passing said effluent hydrocarbon stream and said superheated steam through an exit mixing device having a plurality of separate alternating tubular zones, passing said steam and hydrocarbon streams through such alternating zones and passing from said mixing device a plurality of juxtaposed streams of hydrocarbon and steam.

3. The process of claim 2 wherein the superheated steam is at a temperature of from 825° to 1000° C.

4. The process of claim 2 wherein the superheated steam is at a temperature of from about 900° to about 1000° C.

5. The process of claim 2 wherein the reaction temperature is from about 625° C. to about 675° C.

6. The process of claim 2 wherein the mixing device consists of a plurality of tubes within a tubular shell.

7. The process of claim 2 wherein the mixing device consists of a series of concentric tubes.

References Cited

UNITED STATES PATENTS

| | | | |
|---|---|---|---|
| 3,515,763 | 6/1970 | Vitti | 260—669 |
| 3,118,006 | 1/1964 | Lovett et al. | 260—669 |
| 3,326,996 | 6/1967 | Henry et al. | 260—669 |
| 3,417,156 | 12/1968 | Berger | 260—669 |
| 3,660,510 | 5/1972 | Kindler et al. | 260—669 R |

CURTIS R. DAVIS, Primary Examiner